April 22, 1941.

C. K. BENNETT 2,238,924

HEAT TRANSFER APPARATUS

Filed Sept. 26, 1936

INVENTOR

Clement K. Bennett

BY

ATTORNEYS.

WITNESS:

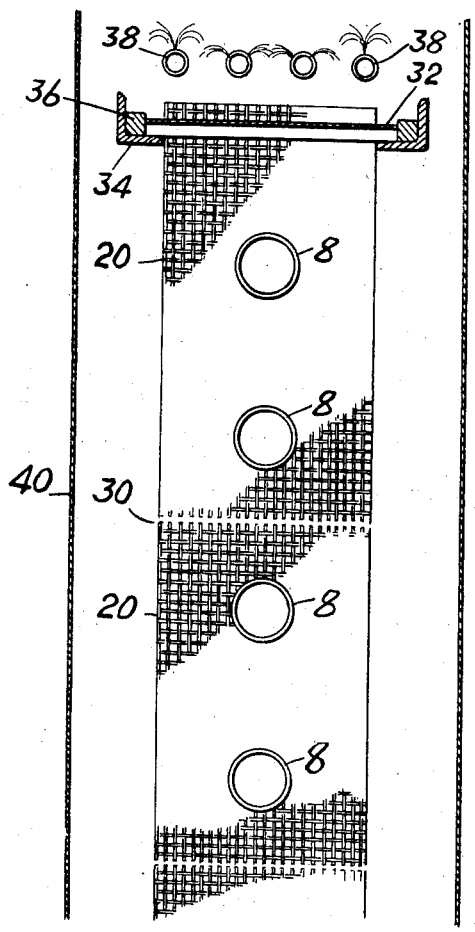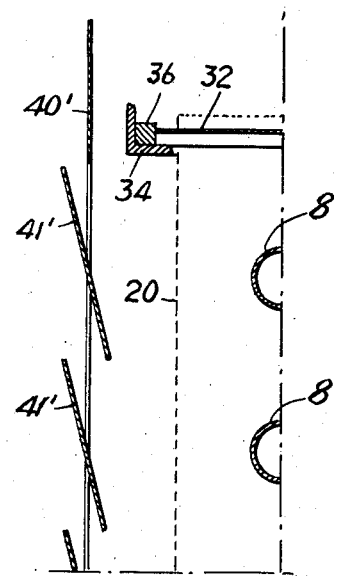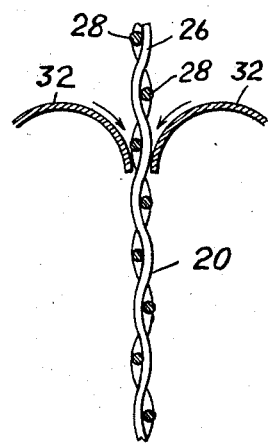

April 22, 1941.  C. K. BENNETT  2,238,924
HEAT TRANSFER APPARATUS
Filed Sept. 26, 1936  4 Sheets-Sheet 3

INVENTOR
Clement K. Bennett
BY
ATTORNEYS.

Patented Apr. 22, 1941

2,238,924

UNITED STATES PATENT OFFICE 2,238,924

HEAT TRANSFER APPARATUS

Clement K. Bennett, Philadelphia, Pa., assignor to C. H. Wheeler Manufacturing Co., Philadelphia, Pa., a corporation of Pennsylvania Application September 26, 1936, Serial No. 102,722

14 Claims. (Cl. 257—55)

This invention relates to heat exchange apparatus and more particularly to heat exchange apparatus of evaporative type designed for the cooling of fluids or the condensation of vapors.

Heretofore evaporative condensers were proposed the design of which did not take into account the factors governing the transfer of heat from the vapors to be condensed to the inner walls of metallic conduits and from the external walls of the metallic conduits to the film of evaporable liquid which was caused to flow thereover. In an application of Frank S. Broadhurst filed of even date herewith, Ser. No. 102,666, there is described and claimed broadly an evaporative condenser which takes properly into account the factors controlling the operation of evaporative heat exchange apparatus with the result that there is provided an apparatus of light, compact form as compared with previous apparatus.

The present invention is directed, to a substantial degree, to certain features whereby there is secured an optimum operation of the novel type of evaporative heat exchange apparatus referred to above, though it is to be understood, and it will be clear hereafter, that the inventions described and claimed in this application are of more general applicability.

In the novel heat exchange apparatus referred to above, it is desirable to get a maximum transfer of heat to the evaporable film from the external surface of the conduit for the fluid from which heat is to be extracted. It is one object of the present invention to provide a form of extended surface usable in connection with said conduit which will produce a highly effective transfer of heat between the surface and a film flowing thereover. Specifically the extended surface has two major characteristics, one of producing substantial turbulence to thereby promote heat transfer and also evaporation, and the other to avoid channeling, that is, the non-uniform wetting of the extended surface by the liquid film, which non-wetting would render the dry parts of the extended surface ineffective. While such extended surface is highly useful in connection with the evaporative heat exchange apparatus referred to above, it will be clear that it has many other uses wherever an extended surface is to be provided over which a liquid film should uniformly flow.

A subsidiary object of the invention related to the one just indicated is the provision of a novel means for securing the improved extended surface upon tubes with which the surface is to be in heat conductive relationship.

Still another object of the invention is the provision of liquid distributing means designed for the purpose of insuring a uniform flowing film of liquid over the improved extended surface or similar surfaces.

In evaporative heat exchange apparatus there is generally substantial loss of the evaporable liquid due to currents of air which carry away from the apparatus sprays of the liquid. In a recirculating system, the amount of liquid thus mechanically carried away represents a very substantial portion of the make-up. It is another object of the present invention to provide an arrangement for minimizing mechanical losses of evaporable liquid while at the same time not interfering with the proper circulation of air or gas into which the flowing liquid is evaporated.

These and other objects of the present invention will become apparent from the following description read in conjunction with the accompanying drawings, in which:

Fig. 2 is a vertical section of the same taken transversely of the tubes;

Fig. 3 is a fragmentary view showing a modified form of shielding arrangement;

Fig. 4 is a fragmentary section illustrating one means for distributing cooling liquid evenly to the fins;

Figure 1:
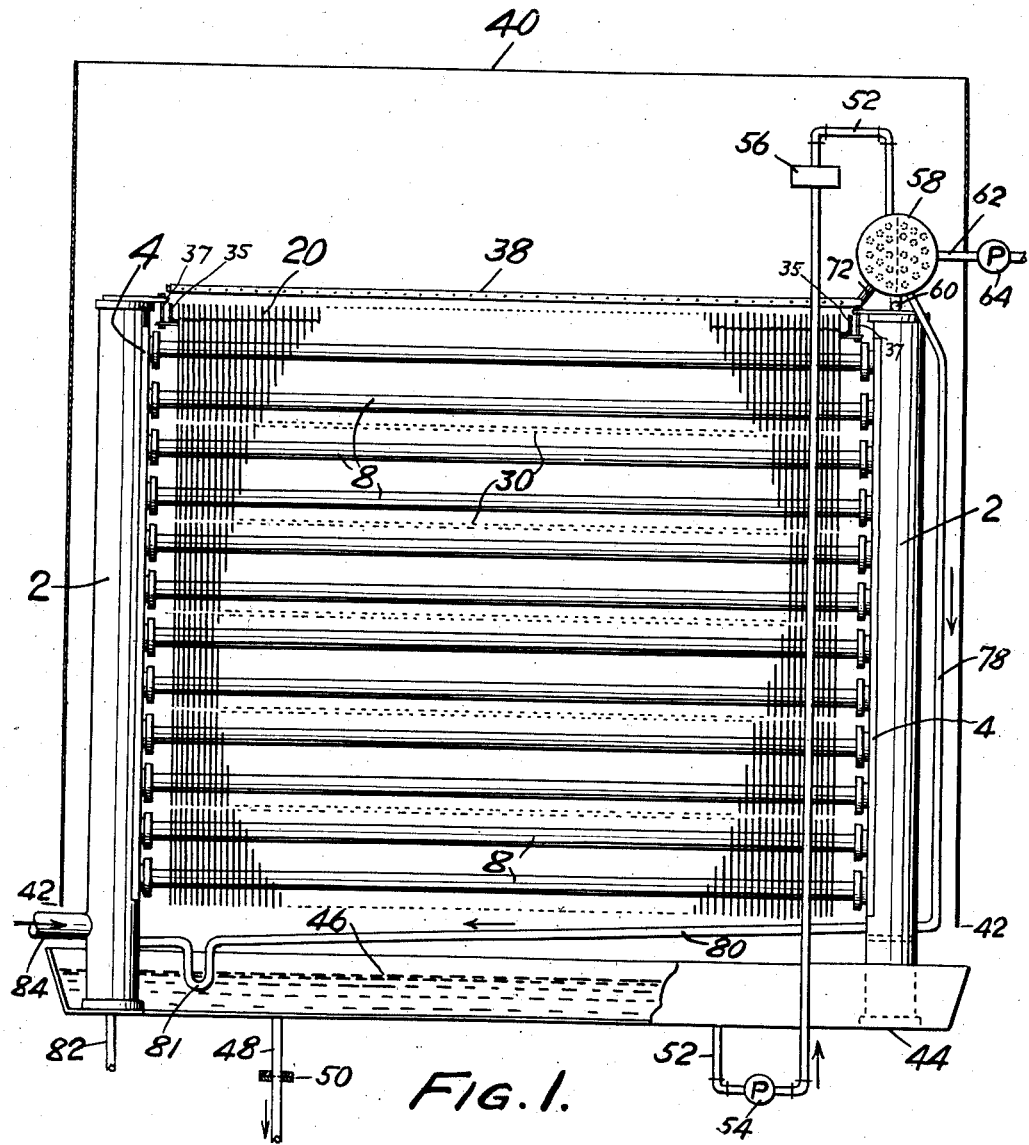
Fig. 1 is an elevation partly in section of an evaporative condenser embodying various features of the invention.

Referring first to Figs. 1, 2, 4, 5 and 6, features of the present invention are disclosed therein applied to an evaporative condenser of the novel type indicated above. The condenser of these figures comprises a single unit which may be associated with other units to form a condenser of any desired size. As shown, the condenser comprises tubular headers 2 which, as shown most clearly in Figs. 5 and 6, have inserted in their sides by welding vertical plates 4. The tubes so formed act as headers for horizontal condensing tubes 8 which may, for example, be formed of thin walled tubing of appropriate size. At their ends these tubes are secured in members 10 which provide flanges and which have formed therein grooves arranged to receive split rings 12 forming abutments for flange members 14, which serve to secure the tubes to the headers through the medium of bolts indicated at 16. Sealing means 18 are interposed between the flanges 10 and the plate 4 to secure a tight joint. The arrangement just described is provided in order that the tubes may be readily removed for replacement or cleaning. The tubes are preferably grouped, for example, in pairs as indicated in Fig. 2 so that the tubes of each group, together with their common fins, form a unit. It has been found that units so formed may be readily handled and are consistent with the most efficient manipulation, providing for efficient manufacturing and production and also proper distribution of cooling water.

Figure 5:
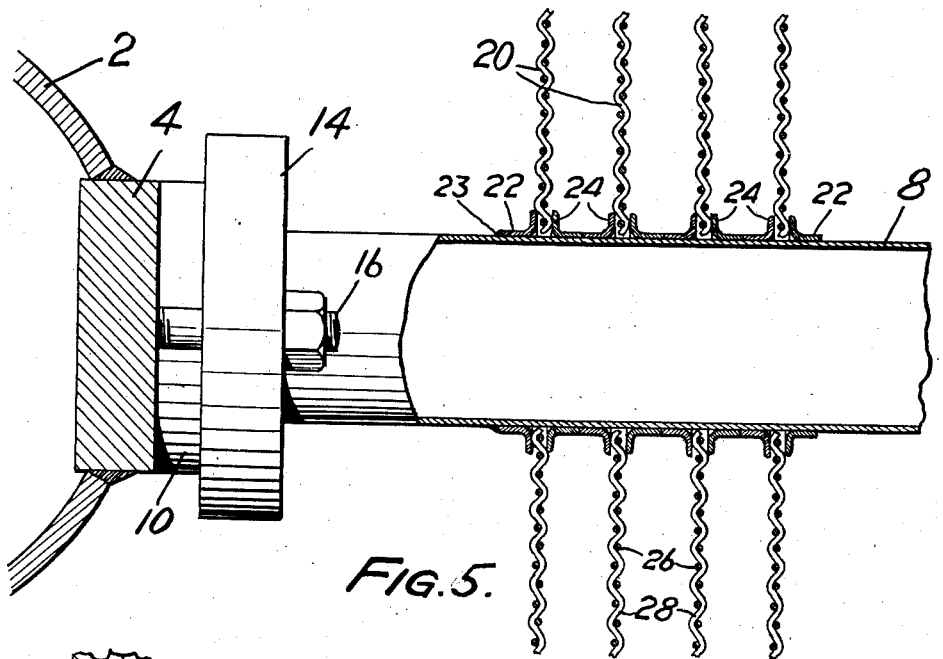
Fig. 5 is a horizontal section showing certain details of the tube and fin construction.
Figure 6:
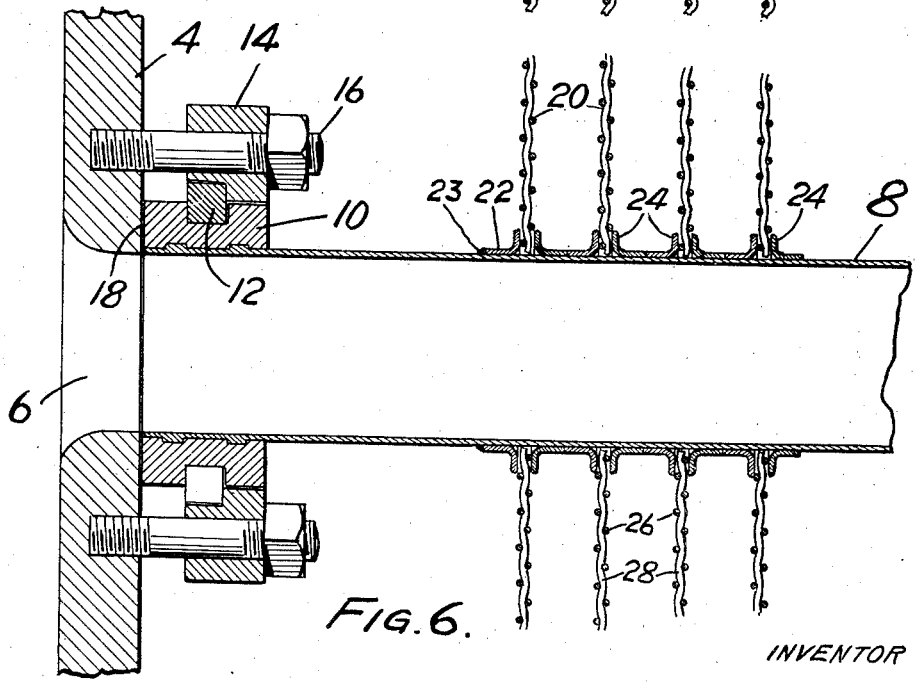
Fig. 6 is a vertical section showing the same subject matter as Fig. 5.

The tubes 8 are secured in their fins in the fashion illustrated in Figs. 5 and 6. Collars 22 are first secured to the tubes of a unit by tack welding, indicated at 23. A fin 20, perforated to receive the tube, or tubes, is then located in engagement with the collar and the entire structure built up with alternating pairs of collars, as indicated at 24, and fins 20 until the tube or tubes of the unit have received the proper number of fins. The entire fin and collar structure is then placed under axial compression and the final collars are tack welded to the tubes as in the case of the initial collars 22. In order to insure a tight joint between the collars, the fins and the tubes, the tubes are then expanded by means of a tool forced or pulled therethrough so that their walls tightly engage the collars. The entire structure is then tinned, galvanized, or otherwise metal coated to insure metallic conductivity between all the elements of the assembly.

The outwardly extending flanges on the collars 22 and 24 may be originally extending at obtuse angles with the tube engaging portions of the collars so that deformation may take place in the axial compression during assembly, thus securing a tight self-adjusting contact between the fins and collar flanges. The flanges may also take an S-shaped form for the same purpose.

In a typical condenser of the type herein specifically illustrated having, for example, three inch tubes, each fin may be about ten inches wide and sixteen inches long, the tubes being spaced approximately eight inches center to center. The fins may be quite close to each other. It has been found that one inch spacing is quite satisfactory, but other spacing may be used if desired, depending upon the fluids being handled.

One of the primary objects of the invention is the use of wire mesh fins of the type illustrated herein. It is found, for example, that when water is being used as the evaporative liquid the best operation is attained when these fins are of a quite definite type. It is found preferable, for example, in an installation having the dimensions already indicated, that a wire mesh is used providing openings from $\frac{1}{8}$ to $\frac{1}{4}$ inch across and that the wire is about $\frac{1}{16}$ inch in diameter. With other liquids of more or less viscous nature, these dimensions may be varied somewhat, though in general it will be found that dimensions such as those indicated are very satisfactory. It is furthermore preferable to use a wire mesh in which the wires running vertically, or in the direction of flow, are comparatively straight while those running horizontally, or transverse to the flow, are heavily crimped and quite wavy. This condition is indicated in Figs. 5 and 6, in which it will be noted that the vertical wires 26 are quite straight as compared with the horizontal wires 28. This construction gives rise to the turbulence which results in the most effective cooling, as will be described in greater detail below.

It appears that the efficacy of a wire mesh or roughened fin surface acting as extended surface in avoiding channeling and producing sufficient turbulence for rapid evaporation depends upon a factor which might be regarded as the ratio of the actual area of the extended surface which is exposed to form a solid-liquid interface to an area which may be defined as double the projected area of the surface, the projection being on a plane parallel to its extent or, in other words, double the area of the shadow which would be produced by parallel rays normal to the surface projected on a plane parallel to the direction of extent of the fin surface. If this ratio or roughness factor is equal to at least 1.9 and the surface is also such as to provide numerous barriers to flow in any direction so as to avoid a smooth flow along any well-defined lines, it will be found that the surface is fairly effective in producing the necessary turbulence without channeling and comparable with wire mesh fins meeting the same requirements.

The tube units, each consisting of one or more tubes (in the present case two) and their associated fins are arranged vertically above each other and secured to the headers 2 as indicated in Figs. 1, 5 and 6. Desirably the various fins of the different units are approximately in vertical alignment so that the cooling water or other liquid flows from the fins of one unit directly to the next. It is also desirable to have the vertical wires lined up as nearly as possible, though in view of the comparatively fine gauge of the mesh this is by no means essential. The fins of the uppermost unit may be extended vertically somewhat higher than the fins of the lower units to project, as indicated in Figs. 1, 2 and 4, above distributing elements 32 consisting of half tubes concave downwardly. These half tubes are interspersed between the fins, preferably quite closely adjacent thereto or in contact therewith. The half tubes are supported at their ends on angle sections 34 which, together with transverse sections 35, form a rectangular frame. The half tubes 32 may be centralized by means of wooden strips 36. They need not be secured in place and are preferably supported as just indicated, so that they may be readily removed if it is desired to remove any of the tube elements. Extending lengthwise of the tube units and transversely of the distributing members 32 there are spray pipes 38 supported on the rectangular frame, which pipes may be arranged as illustrated in Figs. 1 and 2 with the end ones having vertical openings and the intermediate ones pairs of upwardly and outwardly directed openings so as to distribute upon the members 32 as evenly as possible the water which is circulated for cooling. The water falling upon the members 32 is distributed to the fins 20 and runs down the fins in succession. With the mesh arrangement illustrated it is found that substantially complete uniformity of flow is attained without channeling, that is, the production of separate streams with intermediate dry portions of fins which would result in a quite substantial reduction of efficiency.

It is quite essential that the cooling liquid should be distributed as evenly as possible to the half tubes 32. To this end, the frame 34—35 is adjustably supported for levelling by hanger bolts 37 from brackets attached to the headers 2. When very long tubes are provided, it is desirable to use several sets of spray pipes to secure uniformity of distribution of the liquid to be evaporated.

The fins providing the extended surface in the arrangements described herein may vary somewhat from what is specifically shown. In general, however, smooth plates are not particularly satisfactory because of the tendency toward channeling, which not only makes substantial portions of the fins useless, but increases the thickness of the film over the other portions of the fins and thus detrimentally affects the convection which serves to bring the elementary droplets of liquid to the surface where evaporation can take place. Furthermore, smooth surfaces do not produce the turbulence which promotes the rapid transformation of the heat of the surfaces into latent heat of evaporation.

Channeling is due to non-uniformity of a surface over which flow is taking place due, for example, to the presence of dirt, oil or the like. A wetting down agent materially aids in the formation of a uniform film where such uniformity is otherwise hard to secure, though experience has shown that a wetting down agent is substantially unnecessary when fins of the type herein described are used. In addition to wetting down agents, there may also be included in the recirculated liquid suitable materials analogous to boiler compounds to prevent the formation of scale. The continuous blow-down mentioned below, however, makes the latter rather unnecessary.

With the tube and fin arrangement alone exposed to the air, it has been found that wind conditions not only very greatly affected the operation to such extent that the temperatures of various parts of the apparatus and the vacuua attained varied considerably over quite small periods of time, but that mechanical losses occurred much as in old types of evaporative condensers due to the carrying out of the apparatus of spray of cooling water by even slight breezes. While such conditions were accepted and indeed thought necessary for the proper operation of an evaporative condenser, the rather unusual expedient was adopted of surrounding the entire structure by means of a shield 40 formed of metal plates, this shield being spaced a short distance, for example about four inches, from the sides of the assembly to permit the flow of air and also having its bottom 42 spaced a short distance, say about nine inches, above the top of the pan 44. The shield 40 was also extended different distances above the upper end of the fins. It was found that various extensions were satisfactory, for example four feet. The adoption of this construction obviously makes it almost impossible for mechanical loss to occur except by reason of the slow upward circulation of air inside the shield, which could not carry out, through the top, very minute particles of evaporating liquid. At the same time it was found that the induced draft so provided was not only quite as effective as reliance upon the average currents of air existing about the unshielded structure, but that the action became completely uniform despite variations in wind conditions. Furthermore, it was found that the draft so induced made it quite unnecessary to take into account where the apparatus should be placed. It was customary, with previous evaporative coolers, to insure that they were above surrounding buildings so that they would be exposed as much as possible to stray breezes. With the shield, however, it was found that the apparatus would function quite as effectively if it was placed near the ground completely sheltered by buildings as if it was located in an elevated and exposed position. The relatively slight clearance between the bottom 42 of the shield and the pan is sufficient to permit the necessary inflow of air to take care of the evaporation of the liquid.

In Fig. 3 there is illustrated a modified form for the shield or enclosure, which form is particularly applicable where the condenser is of considerable height and consequently substantial resistance would be offered to the flow of air entering the bottom of the structure. In this modification, instead of solid walls as indicated at 40, there may be provided walls 40', which are provided with either fixed or adjustable louvers 41' providing for the entry of air throughout the height of the condenser. Desirably these louvers are so arranged as to be individually opposite the condensing tubes 8, as indicated in the drawings. It will be obvious, however, that the enclosure may take various forms depending on the arrangement of the condenser and the conditions under which it is set up and used. As indicated above, the surrounding shielding structure is primarily provided to avoid loss of the recirculated liquid which would be blown by the wind out of an unshielded structure in the form of spray.

The pan 44, which may take any suitable form, holds the liquid, generally water, 46 which is circulated over the fins and tubes. In order to prevent the accumulation of scale and dirt, a bleeder connection 48 is provided having in it an orifice 50 which controls a slow flow of water from the tray. This continuous blow-down is quite effective in preventing the accumulation of such concentrations of salts as would cause the deposit of scale and the consequent lowering of the efficiency of heat transfer. The amount of water wasted continuously through the blow-down depends, obviously, upon the character of water used. If this is very bad, the water bled away may be 1% to 2% of the water circulated. While this may be a considerable quantity, there must be considered the fact that the water used for make-up may be of very poor quality because of this blow-down. The make-up for the recirculating system is the amount lost by evaporation, mechanically and through the blow-down.

The recirculating connections are indicated at 52 and include a pump 54 arranged to circulate the water or other cooling liquid from the pan 44 through a strainer 56, to remove mechanical dirt, and into the vapor tension reducer 58. This vapor tension reducer is provided to insure that the vacuum pump removes as little moisture as possible. Air from the condenser carrying along uncondensed moisture and, possibly mechanically, some spray, is led to the reducer through pipe 60 from the header 2 opposite the one into which the steam enters. The connection 62 serves for the outlet of air to the vacuum pump conventionally illustrated at 64, which pump may be of any suitable design to take care of the gases which accumulate and so maintain the desired vacuum. The vapor tension reducer forms no part of the present invention and is more fully described in the Broadhurst application mentioned above. It is only necessary to state that make-up water may enter it and flow from it through the pipe 72 to the spray pipes 38.

Any condensate in the reducer 58 may flow off through the pipe 78 to the lower end of one of the headers. A sloping connection 80 provided with a water seal 81 joins the lower ends of the headers to drain the condensate from the condensate header back into the steam header, this being desirable if the unit is operating in such fashion that the condensate is subcooled, i. e. cooled below the boiling point at the vacuum maintained. By causing any sub-cooled condensate to enter the steam header, the condensate finally drawn off at 82 and passing to the condensate pump will not be sub-cooled. Steam may enter one of the headers through the connection indicated at 84.

Fig. 1 shows what may be regarded as a single basic unit. Where a greater capacity is desired a number of such units may be arranged side by side or end to end with suitable spacings between the fins if they are side by side, which spacings, it may be noted, are necessary because the area directly above the fins is substantially closed by the water-distributing system in the modification so far described. This spacing, nevertheless, need not be large, and only of the order of six to twelve inches if space is at a premium. In general, however, the spacing between the units, when placed side by side, should be sufficient to permit free access for cleaning or inspection so that the spacing may be considerably in excess of that required for operation. There is no necessity for providing separate shields such as 40 about the individual units, but the entire collection of units may be shielded. The units are preferably operated in parallel in a steam condenser system. There may be a single vapor tension reducer used for all of them in that case. With a proper contact of the fins and tubes of the type achieved by the construction described above, the heat transfer between the tubes 8 and the fins 20 becomes a negligible consideration. The heat transfer through the wire mesh, which is tinned or galvanized or otherwise bonded so that the various strands are in good metallic contact with each other and the tube, is very high, and despite the fact that the fins extend very substantially away from the tubes, a substantial temperature gradient exists even near the edges, so that the entire area of each fin is active in contributing to the operation. This, it may be noted, is a substantial departure from conventional ideas of evaporative condenser construction, which would indicate that the fins to be effective should extend to comparatively short distances from the tubes and should desirably be of solid metal so as to afford a maximum cross-section at all localities where heat flow is taking place.

In order to insure proper operation, it is also necessary that channeling of liquid be avoided so that the entire area of every fin should be taking part in the heat transfer. Any portion of a fin over which no liquid flow is taking place becomes inoperative. At the same time, if a given quantity of liquid is flowing and channeling occurs, it means that a thicker film is built up and the transfer through the film is correspondingly reduced because convection is lessened. By the adoption of wire mesh arranged as described, it has been found that channeling is totally avoided and that the fins are substantially entirely covered with a flowing film.

At the same time, fins of this type provide the turbulence which is necessary to secure good heat transfer. The thickness of a film is a detriment, since it is necessary that the heat be transferred from the portion of the film in contact with the metallic surface to the portion in contact with the air before evaporation can take place. If placid flow is relied upon, then the heat transfer just mentioned can only occur through conduction. However, if turbulence is produced and at the same time the film is maintained very thin, the transfer will occur almost immediately by the actual and almost immediate exposure to the air of those elements of the liquid which were in contact with the metallic surface.

With fins of the type indicated, or similar fins as described below which will provide a turbulence and consequent convective transfer of heat through the film, it is found that the film of water over the external wetted surface should comprise a quantity between twenty and seventy pounds per hour per square foot of said surface.

Figure 7:
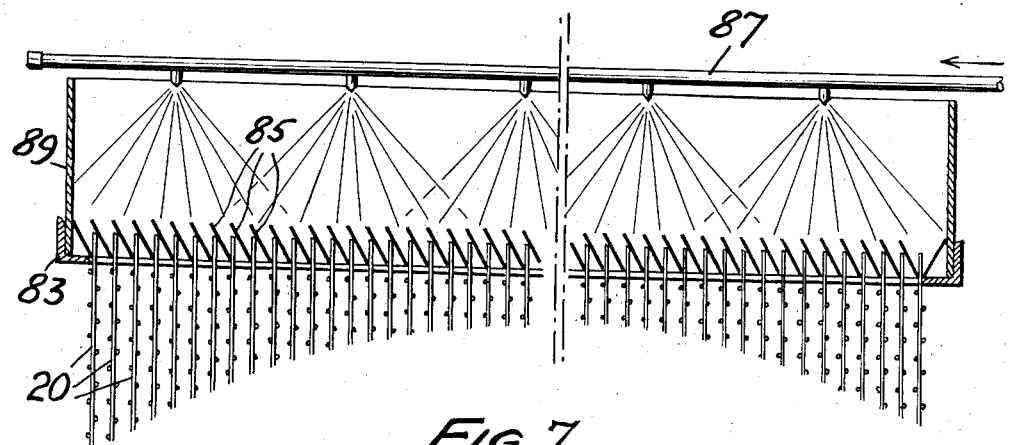
Fig. 7 is a fragmentary vertical section showing a modified means for distributing cooling liquid evenly to the fins.
Figure 8:
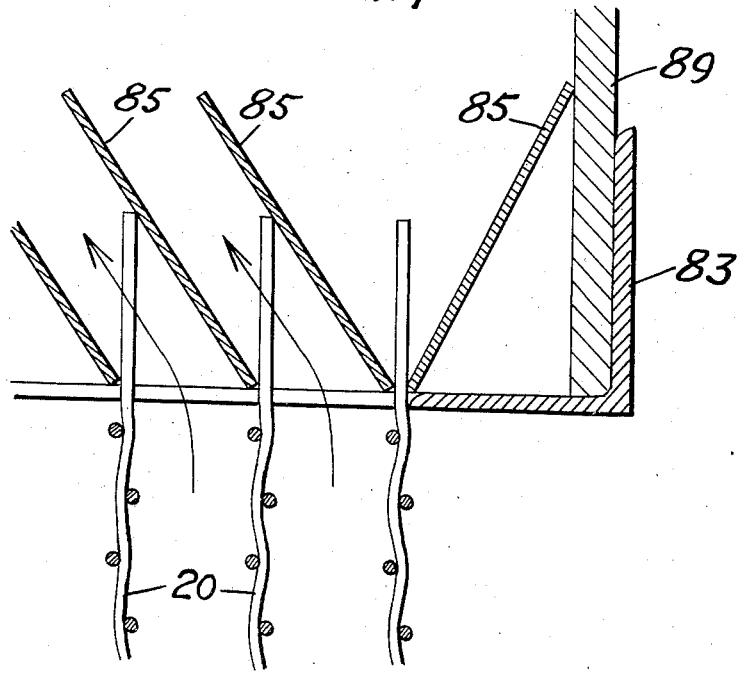
Fig. 8 is an enlarged view of a portion of Fig. 7 showing details.

In Figs. 7 and 8 there is illustrated a modified arrangement somewhat preferable to that heretofore described for distributing to the fins the liquid to be evaporated. The fins indicated at 20, which may take any suitable form but which are preferably of the type previously described, have their upper ends projecting through a frame 83 similar to that formed by the angle sections 34 and 35 and similarly adjustably supported for levelling purposes. Supported by this frame 83 there are plates 85 resting in sloping position, as indicated in the drawings, against the upper ends of the fins, which, if they are of a wire mesh type, desirably have the transverse wires removed from their upper ends.

One or more spray pipes 87 provided with spray nozzles extend above the plates 85 and spray the cooling liquid upon them, the nozzles being so arranged as to secure a substantially equal distribution of liquid upon the plates. The arrangement is preferably surrounded by an enclosure 89 to avoid loss of spray.

With this arrangement it will be observed that in contrast to that previously described free circulation paths for the air are provided, flow taking place upwardly through the upper ends of the fins and between the plates, as indicated by the arrows in Fig. 8. As a result of this construction, the clearance of the shield 40 with the sides of the fins may be reduced or eliminated altogether, though, as pointed out above, it is desirable that some clearance should be left for inspection purposes.

In this connection it may be remarked that it is desirable to provide some roof arrangement over a device of this nature to reflect the heat rays from the sun. In the case of the arrangement of Figs. 7 and 8, the plates 85 may be formed of aluminum or painted so as to reflect the heat rays and thereby automatically provide a protective roof for the condenser.

The necessity for lining up the fins 20 may be avoided by arranging the condensing tubes 8 in sloping position at slight angles to the horizontal while associating with them and at right angles to their axes fins such as those indicated at 20. Under such conditions the fins associated with one pair of tubes will bear an overlapping relation in a vertical direction to the fins associated with pairs of tubes above and below those first mentioned. As a result, not only may there be much less care taken in insuring distribution of evaporable liquid to the uppermost fins, but the overlapping relationship will insure that the lower fins will have the evaporable liquid properly distributed over them.

Another modification which may be mentioned is the arrangement of the steam headers such as 2 in horizontal or substantially horizontal position, preferably having the header into which the steam enters at a somewhat lower level than the other. The condensing tubes connecting them will then be arranged in a sloping bank which will provide for the automatic flow of condensate toward the end at which steam enters. A number of these banks may be arranged one above the other to build up the necessary condensing surface.

There has been described specifically herein an arrangement for condensation of steam or other vapors which, as pointed out, in its general aspects forms the invention described and claimed in the Broadhurst application mentioned above, to which reference may be made for a detailed consideration of the features of operation. From the structural standpoint, when the invention is applied to an evaporative condenser for steam, the fins should be such as to provide an actual external liquid contacting surface of the steam conduit, i. e., the tubes plus fins, at least five times the internal fluid contacting surface of the conduit.

Considering specifically the invention claimed herein, it may be pointed out that the fin arrangement may be used for many other purposes and, in fact, is not limited to use in connection with an evaporative cooling apparatus. For example, the fin arrangement may be used where it is desired to either cool or heat liquid flowing in a turbulent film thereover. The turbulence, which is a primary feature of the operation, provides for a maximum amount of heat transfer over a given fin area. In cooling apparatus, for example, the tubes to which the fins are secured may contain a refrigerating medium, the liquid to be cooled being passed over the fins in the form of a film. The fins are, of course, of such nature as to be very well adapted for an arrangement in which evaporation of the film-forming liquid is desired, the turbulence produced by the mesh fins and the openings therein promoting the rapidity of evaporation.

The fins may be arranged otherwise than as herein specifically illustrated. For example, they may be arranged lengthwise of, and extending radially from, upright tubes as specifically shown in the Broadhurst application. In such case, as before, the straighter wires are arranged to extend in the direction of flow with the more crimped wires extending transversely to that direction.

The shielding arrangement which also forms a subject matter of the invention is primarily adapted for promoting evaporation without spray losses, though here again where air, for example, is used as a cooling medium with little regard for the evaporation which it may produce, the shield is of substantial advantage. This is true, for example, in the cooling of oils or the like, in which case evaporation is negligible but spray losses might be quite serious.

It will be clear that numerous variations may be made in the specific embodiment of the invention without departing therefrom.

What I claim and desire to protect by Letters Patent is:

1. Heat transfer apparatus including a conduit for fluid, said conduit comprising a tube having fins extending outwardly therefrom with the fins arranged upright, means for leading fluid to the interior of the conduit, and means for providing a flowing film of liquid over the fins, said fins comprising heat conductive wire mesh having its wires arranged to produce turbulence and uniform flow thereover.

2. Heat transfer apparatus including a conduit for fluid, said conduit comprising a tube having heat-conductive fins extending outwardly therefrom with the fins arranged upright, means for leading fluid to the interior of the conduit, and means for providing a flowing film of liquid over the fins, said fins presenting to liquid flowing downwardly thereover numerous transverse and laterally irregular barriers producing turbulent flow and having an actual exposed area at least 3.8 times their projected area.

3. Heat transfer apparatus including a surface through which heat transfer is to take place, fins extending outwardly therefrom and arranged upright, and means for providing a flowing film of liquid over the fins, said fins comprising heat-conductive wire mesh having its wires arranged to produce turbulence and uniform flow thereover.

4. Heat transfer apparatus including a surface through which heat transfer is to take place, heat-conductive fins extending outwardly therefrom and arranged upright, and means for providing a flowing film of liquid over the fins, said fins presenting to liquid flowing downwardly thereover numerous transverse and laterally irregular barriers producing turbulent flow and having an actual exposed area at least 3.8 times their projected area.

5. An evaporative heat transfer apparatus including a conduit for fluid from which heat is to be removed, said conduit comprising a tube having fins extending outwardly therefrom with the fins arranged upright, means for leading fluid to the interior of the conduit, and means for providing a flowing evaporable film of liquid over the fins, said fins comprising heat-conductive wire mesh having its wires arranged to produce turbulence and uniform flow thereover.

6. Heat transfer apparatus including a conduit for fluid, said conduit comprising a tube having fins extending outwardly therefrom, means for leading fluid to the interior of the circuit, and means for providing a flowing film of liquid over the fins, said fins comprising heat-conductive wire mesh having its wires which extend substantially in the direction of flow substantially straighter than its wires which extend transverse to the direction of flow, the arrangement being such as to produce turbulence and uniform flow thereover.

7. An evaporative heat transfer apparatus including a conduit for fluid from which heat is to be removed, said conduit comprising a tube having fins extending outwardly therefrom, means for leading fluid to the interior of the conduit, and means for providing a flowing evaporable film of liquid over the fins, said fins comprising a heat-conductive wire mesh having its wires which extend substantially in the direction of flow substantially straighter than its wires which extend transverse to the direction of flow, the arrangement being such as to produce turbulence and uniform flow thereover.

8. Heat transfer apparatus including a conduit for fluid, said conduit comprising a tube, fins embracing and extending outwardly from said tube and arranged upright and comprising heat-conductive wire mesh having its wires arranged to produce turbulence and uniform flow thereover, and collars surrounding the tube and arranged to space and clamp said fins, means for leading fluid to the interior of the conduit, and means for providing a flowing film of liquid over the fins.

9. Heat transfer apparatus including a conduit for fluid, said conduit comprising a tube, fins embracing and extending outwardly from said tube and arranged upright and comprising heat-conductive wire mesh having its wires arranged to produce turbulence and uniform flow thereover, and collars surrounding the tube and arranged to space and clamp said fins, a metallic coating over the exterior of the tube, the fins and the collars, means for leading fluid to the interior of the conduit, and means for providing a flowing film of liquid over the fins.

10. Heat transfer apparatus including a conduit for fluid, said conduit comprising a tube, fins embracing and extending outwardly from said tube and arranged upright and comprising heat-conductive wire mesh having its wires arranged to produce turbulence and uniform flow thereover, and collars surrounding the tube and arranged to space and clamp said fins, said tube being expanded into tight engagement with said collars, means for leading fluid to the interior of the conduit, and means for providing a flowing film of liquid over the fins.

11. Heat transfer apparatus including a conduit for fluid, said conduit comprising a tube having heat-conductive fins extending outwardly therefrom, means for leading fluid to the interior of the conduit, and means for providing a flowing film of liquid over the fins, the last means comprising distributing members separate from the fins having substantially horizontal edges extending adjacent the fins and approaching them in substantially abutting relationship in a downwardly sloping direction, said distributing members vertically overlapping each other but providing sloping passages between them.

12. Heat transfer apparatus including a conduit for fluid, said conduit comprising a tube having upright metallic wire mesh fins extending outwardly therefrom, means for leading fluid to the interior of the conduit, and means for providing a flowing film of liquid over the fins, the last means comprising distributing members separate from the fins having substantially horizontal edges extending adjacent the fins and approaching the wires thereof in substantially abutting relationship in a downwardly sloping direction, said wire mesh having its wires arranged to produce turbulence and uniform flow thereover.

13. Heat transfer apparatus including a conduit for fluid, said conduit comprising a tube having upright metallic wire mesh fins extending outwardly therefrom, means for leading fluid to the interior of the conduit, and means for providing a flowing film of liquid over the fins, the last means comprising distributing members separate from the fins having substantially horizontal edges extending adjacent the fins and approaching the wire thereof in substantially abutting relationship in a downwardly sloping direction, said distributing members vertically overlapping each other but providing sloping passages between them, said wire mesh having its wires arranged to produce turbulence and uniform flow thereover.

14. Heat transfer apparatus including a conduit for fluid, said conduit comprising a tube having metallic fins extending outwardly therefrom with the fins arranged upright, means for leading fluid to the interior of the conduit, and means for providing a flowing film of liquid over the fins, said fins presenting to liquid flowing downwardly thereover numerous openings and transverse and laterally irregular barriers producing turbulent flow and uniform distribution of such liquid over the fins, and said means for providing a flowing film of liquid over the fins comprising distributing members separate from the fins and having substantially horizontal edges extending adjacent the fins and approaching said openings and barriers in substantially abutting relationship in a downwardly sloping direction.

CLEMENT K. BENNETT.